(12) United States Patent (10) Patent No.: US 12,643,361 B2
Graaf et al. (45) Date of Patent: Jun. 2, 2026

(54) ACTIVE SPRING UNIT

(71) Applicant: Ford Global Technologies, LLC, Dearborn, MI (US)

(72) Inventors: Roger Graaf, Vaals (NL); Daniel Mainz, Herzogenrath (DE); Paul Zandbergen, Wurselen (DE); Nicole Zandbergen, Wurselen (DE); Ralf Hintzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/956,586

(22) Filed: Nov. 22, 2024

(65) Prior Publication Data

US 2025/0162371 A1 May 22, 2025

(30) Foreign Application Priority Data

Nov. 22, 2023 (DE) .......................... 102023132500.0

(51) Int. Cl.
B60G 11/18 (2006.01)
B60G 11/20 (2006.01)
B60G 17/015 (2006.01)
B60G 17/02 (2006.01)
(Continued)

(52) U.S. Cl.
CPC ...... B60G 17/0152 (2013.01); B60G 2202/42 (2013.01); B60G 2204/419 (2013.01)

(58) Field of Classification Search
CPC .. B60G 11/20; B60G 17/0152; B60G 17/025; B60G 21/0553; B60G 21/0555;
(Continued)

(56) References Cited

U.S. PATENT DOCUMENTS

| | | | |
|---|---|---|---|
| 8,511,697 B2 | 8/2013 | Ohletz et al. | |
| 12,507,614 B2 * | 12/2025 | Utz .......................... | A01C 7/18 |
| 2009/0283977 A1 * | 11/2009 | Michel ................. | B60G 13/003 |
| | | | 280/6.157 |
| 2022/0135124 A1 * | 5/2022 | Krammel ........... | B60G 17/0162 |
| | | | 280/6.15 |
| 2024/0336298 A1 * | 10/2024 | Wang ..................... | B60G 7/005 |

FOREIGN PATENT DOCUMENTS

| | | | |
|---|---|---|---|
| DE | 10242552 A1 | 3/2004 | |
| DE | 102007040736 A1 * | 4/2009 | ......... B60G 21/0556 |

(Continued)

OTHER PUBLICATIONS

Description Translation for DE 102016223235 from Espacenet (Year: 2016).*

*Primary Examiner* — Jason D Shanske
*Assistant Examiner* — Daniel M. Keck
(74) *Attorney, Agent, or Firm* — Burr & Forman; Lorne Forsythe

(57) ABSTRACT

The invention relates to an active spring unit for the sprung mounting of a wheel suspension element relative to a vehicle body. To provide an optimized active wheel suspension that is designed both for fast and for slow adjustments, provision is made according to the invention whereby the active spring unit has a spring element which is mounted on the vehicle body and which has a torsion portion which extends along a torsion axis from a wheel region, in which said torsion portion is couplable torque-transmittingly to the wheel suspension element, to a primary drive region, in which said torsion portion is coupled torque-transmittingly to a self-locking primary actuator unit, wherein a non-self-locking secondary actuator unit is torque-transmittingly coupled at least indirectly to the wheel region, at least partially bypassing the torsion portion.

9 Claims, 6 Drawing Sheets

(51) Int. Cl.
　　　*B60G 21/055*　　　　(2006.01)
(58) Field of Classification Search
　　　CPC .......... B60G 2202/13; B60G 2202/132; B60G
　　　　　　　　　2202/134; B60G 2202/135; B60G
　　　　　　　　　2202/1351; B60G 2202/136; B60G
　　　　　　　　　2202/1362; B60G 2202/40; B60G
　　　　　　　2202/42; B60G 2202/43; B60G 2202/442;
　　　　　　B60G 2204/122; B60G 2204/1222; B60G
　　　　　　　　　2204/1224; B60G 2204/1226; B60G
　　　　　　　　　2204/419; B60G 2204/4191; B60G
　　　　　　　　　2204/42; B60G 2204/421; B60G
　　　　　　　　　2204/422; B60G 2206/427
　　　USPC ...................................................... 280/5.515
　　　See application file for complete search history.

(56)　　　　　　　References Cited

FOREIGN PATENT DOCUMENTS

| DE | 102010062190 A1 * | 5/2012 | ........... B60G 21/055 |
|----|----|----|----|
| DE | 102011106246 A1 | 1/2013 | |
| DE | 102014225290 A1 * | 6/2016 | ......... B60G 21/0555 |
| DE | 102016223235 A1 * | 5/2018 | ............. B60G 17/02 |
| DE | 102017222082 A1 * | 6/2019 | ......... B60G 17/0157 |
| EP | 2322366 B1 | 3/2014 | |
| KR | 1020160081047 A | 7/2016 | |
| WO | 2010105721 A1 | 9/2010 | |
| WO | WO-2016173768 A1 * | 11/2016 | ............. B60G 17/02 |
| WO | 2021240415 A1 | 12/2021 | |

* cited by examiner

Fig.4

ACTIVE SPRING UNIT

The invention relates to an active spring unit.

In wheel suspensions of modern motor vehicles, various elements are used to improve driving behavior and driving comfort. On the one hand, use is made of passive elements, namely springs and dampers. These make it possible for a wheel carrier and a vehicle wheel arranged thereon to be deflected relative to the vehicle body, wherein springs temporarily store energy, whilst dampers dissipate energy in order to dampen vibrations. It is furthermore also known to use active elements, the behavior of which is not limited merely to elastic energy storage or energy dissipation. Such active elements can be actuated in order to impart a variable force between wheel carrier and vehicle body. Correspondingly, these elements can also introduce energy, for example by actively raising the vehicle body. These active elements, which can also be referred to as spring actuators or suspension actuators, are often combined with passive elements, in particular with springs.

For such an active spring unit or spring-damper unit, there are various technical challenges. Active spring actuators must satisfy conflicting requirements that arise from the need for short-term ride-height control operations with high adjustment speeds, for example for the purposes of improving driving comfort or handling, and ride-height control operations with low adjustment speeds, for example for the purposes of facilitating embarking and disembarking or for the purposes of reducing air resistance. Different actuators are required for these two applications, which actuators are arranged at different points in the suspension architecture. The high-speed actuator must be arranged in parallel with respect to the spring in terms of the force flow, because otherwise the spring would act as a low-pass filter. Furthermore, the actuator would always bear the weight of the vehicle, which would lead to high energy consumption. The low-speed actuator must be arranged in series with the spring of the vehicle, because said actuator would otherwise limit the spring travel of the wheel and would preload the spring.

Use may be made in particular of hydraulic actuators or electric actuators, wherein both systems have certain disadvantages. Hydraulic actuators require a centralized fluid system having hydraulic tanks, pumps and numerous hydraulic lines that must be routed throughout the entire vehicle. This results in an expensive and complex vehicle assembly process. Electrical actuators that operate with low voltage (<48 V) require a considerable current in order to function optimally. A power demand of 2 to 5 KW per wheel, that is to say a total of 8 to 20 kW for the entire vehicle, necessitates maximum currents of 160-410 A.

KR 10 2016 0 081 047 A discloses an active suspension system for vehicles, which active suspension has a reduction gearing, a static load-holding device and a rotation-detecting sensor. The reduction gearing increases the torque of an electric motor and reduces the rotational speed. The static load-holding device has a center of rotation corresponding to an axis of rotation of the electric motor, and transmits the movement of the reduction gearing to a vehicle wheel. The transmission takes place via a hydropneumatic spring device. The rotation-detecting sensor calculates an angle of rotation about an axis of rotation of the static load-holding device, and transmits the angle of rotation to a controller.

WO 2010/105 721 A1 presents an active electromechanical suspension system for a chassis of a motor vehicle having a first and a second axle for in each case two oppositely situated wheels. Here, the first axle is assigned spring struts, having spring strut actuators, for each of the oppositely situated wheels, and the second axle is assigned active spring units, having rotary actuators, for each of the oppositely situated wheels.

WO 2021/240 415 A1 presents a vehicle having a suspension system which connects a wheel carrier to a vehicle bodyshell and which has a suspension arm and a spring element. An electromechanical rotary actuating element is arranged on the vehicle bodyshell and has an electric motor and a reduction gearing, said gearing having at least one reduction stage which in turn has an output shaft, the axis of rotation of which extends parallel to the axis of a joint that connects the suspension arm to the vehicle bodyshell. A lever device is designed to transmit the movement from the reduction stage via the output shaft to the suspension arm. Sensor means are configured to detect parameters that indicate a movement of the suspension arm, and an electronic control unit is configured to control the torque and the angular position of the electric motor on the basis of the signals transmitted by the sensor means.

U.S. Pat. No. 8,511,697 B2 discloses an arrangement of a two-part stabilizer on a wheel suspension system for a motor vehicle, said stabilizer having mutually separate torsion bars which are articulated, in each case via an output lever, on wheel suspension elements and which are rotatable in the same direction as or in opposite directions to one another by means of respectively associated actuating devices, wherein each torsion bar, in order to increase its effective torsional length, is lengthened by means of a hollow shaft which surrounds the torsion bar and on which the drive lever is formed, wherein the torsion bar is mounted in a fixed bearing in the actuating device and is mounted in an axial non-locating bearing in the hollow shaft.

DE 102 42 552 B4 presents a device for electromechanically adjusting a two-part stabilizer in chassis of vehicles, in particular motor vehicles, said device having an electric motor and having an adjusting gearing which is designed as a planetary gear differential and which has at least one input element driven by the electric motor, two output elements acting on the stabilizer halves, and at least two balancing elements that connect the output elements to one another in terms of drive. Here, as an input element, a planet gear carrier is provided, the axially mutually spaced and coupled-together planet gears of which, as balancing elements, mesh with sun gears as output elements, wherein the numbers of teeth of the sun gears and of the planet gears are unequal, and the electric motor is fastened to the motor vehicle body.

EP 2 322 366 B1 discloses an arrangement of a two-part stabilizer on a wheel suspension system for a motor vehicle, wherein each stabilizer part has at least one torsion bar which is articulated via an output lever on a wheel suspension element and which is rotatable by means of a motor-gearing unit, wherein a gearing stage is connected between the gearing of the motor-gearing unit and the torsion bar and allows an axially parallel arrangement of the motor/gearing unit and the torsion bar, wherein the torsion bar is oriented substantially at right angles to the vehicle transverse direction.

DE 10 2011 106 246 A1 has disclosed an actuating device for a wheel suspension system of a motor vehicle, the actuating device having at least one electric motor by means of which a torsion bar that acts on a wheel control element of the wheel suspension system can be preloaded via a reduction gearing, wherein the electric motor is arranged with a radial spacing to the torsion bar. Here, the electric motor outputs drive via an intermediate gearing to the reduction gearing, which is arranged coaxially with respect to the torsion bar.

In view of the highlighted prior art, the provision of an active wheel suspension that is designed both for fast and for slow adjustments still offers potential for improvement.

It is the object of the invention to provide an active spring unit, that is to say an optimized active wheel suspension system, which is designed both for fast and for slow adjustments.

According to the invention, the object is achieved by means of an active spring unit having the features of claim 1, wherein the subclaims relate to advantageous refinements of the invention.

Note that the features and measures individually specified in the following description may be combined with one another in any technically meaningful way and reveal further refinements of the invention. The description additionally characterizes and specifies the invention, in particular in conjunction with the figures.

The invention provides an active spring unit for the sprung mounting of a wheel suspension element relative to a vehicle body. The active spring unit is an active spring unit for a vehicle, more specifically for a wheel suspension system of a vehicle. Said active spring unit may be used for a motor vehicle such as a truck or passenger car, but also for example for a trailer without a dedicated drive. The active spring unit may be part of a wheel suspension system of the vehicle, though may also have elements which, strictly speaking, do not belong to the wheel suspension system. Said active spring unit serves for the sprung mounting of a wheel suspension element on, or for the resilient connection of a wheel suspension element to, a vehicle body, whilst allowing not only passive sprung mounting but also active sprung mounting, or active influencing of the position, of the wheel suspension element. Active vibration damping is also possible. In this context, "vehicle body" is used as a collective term for a bodyshell, a chassis and any subframe of the vehicle in question, that is to say those parts which normally form the sprung mass. The wheel suspension element is typically deflectable relative to the vehicle body at least along the vehicle vertical axis (Z axis). Deflection may additionally also be possible with a component along the vehicle longitudinal axis (X axis) and/or along the vehicle transverse axis (Y axis). The wheel suspension element may in particular be a link, for example a longitudinal link, transverse link or semi-trailing link, which in the assembled state is in turn connected to a wheel carrier on which a vehicle wheel is rotatably mounted. Said wheel suspension element could however also be the wheel carrier itself, for example.

The active spring unit has a spring element which is mounted on the vehicle body and which has a torsion portion which extends along a torsion axis. The spring element or at least the torsion portion thereof may also be referred to as torsion spring, torsion spring element or torsion element. The torsion portion extends along a torsion axis, which may also form an axis of symmetry of the torsion portion. Said torsion portion is designed to elastically deform, and thus absorb and store energy, under the action of a torsional moment acting about the torsion axis. In so doing, said torsion portion generates an opposing torque. In principle, different materials may be used for the spring element and/or the torsion portion, provided that these have adequate elastic properties and otherwise have adequate durability for use as part of the wheel suspension system. As materials, use may be made in particular of spring steel and composite material, in particular fiber composite material. Such a fiber composite material has fibers, for example glass fibers, carbon fibers and/or aramid fibers, which, for the purposes of reinforcement, are embedded into a polymer matrix (for example a plastics or synthetic resin matrix consisting of epoxy resin or the like). It is optionally possible here for further particles, layers or components that cannot be classified as polymers or as fibers to be embedded into or deposited onto said matrix. It is also possible for different materials to be used for different parts of the spring element. The spring element is mounted on the vehicle body so as not to be movable arbitrarily relative to the vehicle body. However, said spring element may be connected by means of one or more bearings to the vehicle body such that at least torsion of the torsion portion is possible.

The torsion portion extends along the torsion axis from a wheel region, in which said torsion portion is couplable torque-transmittingly to the wheel suspension element, to a primary drive region, in which said torsion portion is coupled torque-transmittingly to a self-locking primary actuator unit. The wheel region and the primary drive region are subregions of the torsion portion, more specifically the end regions thereof. As will become clearer further below, these however need not be end portions of the spring element; said spring element may rather extend beyond the wheel region or beyond the primary drive region. In the wheel region, the torsion portion is torque-transmittingly couplable to the wheel suspension element. In the assembled state, said torsion portion is torque-transmittingly coupled to the wheel suspension element. Here and below, where no other reference is explicitly given, the transmission of torque always relates to the torsion axis. The active spring unit is thus designed such that a transmission of torque is possible between the wheel region and the wheel suspension element. Accordingly, a torsional moment in the torsion portion can generate a force on the wheel suspension element, and the wheel suspension element can equally impart a force that leads to a torsional moment.

The torsion portion is torque-transmittingly coupled in the primary drive region to the primary actuator unit, that is to say the primary actuator unit can exert a torque on the primary drive region, wherein an opposing torque and a corresponding force can react on the primary actuator unit. The term "primary actuator unit" indicates that this has at least one primary actuator. The primary actuator unit can impart a torque that can lead to a rotation of the primary drive region relative to the vehicle body. Here, the primary actuator unit is of self-locking design, that is to say it can itself drive the primary drive region, that is to say set the latter in motion, whereas, conversely, a torque within the primary drive region cannot lead to an adjustment of the primary actuator unit. Accordingly, the position of the primary drive region is determined by the primary actuator unit. A torsion in the torsion portion between the wheel region and the primary drive region can thus be influenced, which in turn leads to a change in the rest position of the wheel suspension element. Forces exerted, for example, by the wheel suspension element on the torsion portion lead to a torque, but said torque cannot adjust the primary actuator unit because the latter is of self-locking design.

Here, a non-self-locking secondary actuator unit is torque-transmittingly coupled at least indirectly to the wheel region, at least partially bypassing the torsion portion. The name "secondary actuator unit" in turn indicates that this has at least one secondary actuator. The secondary actuator unit is torque-transmittingly coupled at least indirectly to the wheel region. That is to say, there may be a direct connection between the secondary actuator unit and the wheel region, though an indirect connection via a further element or via a part of the torsion portion may also be provided. In any case, the coupling has a torque-transmitting action, such that the secondary actuator unit can transmit a torque to the wheel region. By contrast to the primary actuator unit, however, the secondary actuator unit is of non-self-locking design. Accordingly, a torque reacting on the secondary actuator unit can lead to an adjustment thereof. On the other hand, the secondary actuator unit can actively generate a torque in the wheel region, which in turn leads to a force on the wheel suspension element. Irrespective of whether the coupling to the wheel region is direct or indirect, said coupling at least partially bypasses the torsion portion. The connection is thus provided at most via a part of the torsion portion, and in some cases is even entirely independent of the torsion portion. That is to say, the force flow between the secondary actuator unit and the wheel region passes at most through part of the torsion portion, whereas another part, or even the entire torsion portion, is bypassed.

The active spring unit according to the invention allows two independent active manipulations of a force acting on the wheel suspension element. Provision is made here for relatively slow changes to be made by means of the primary actuator unit. This adjusts a general preload of the torsion portion, as it were, via the primary drive region. In this way, it is for example possible to set a generally relatively hard or relatively soft spring characteristic, or the vehicle body can be raised or lowered relative to the chassis. Since the primary actuator unit is self-locking, the preload cannot be changed without active adjustment of the primary actuator unit. On the other hand, the torsion portion allows an elastic movement of the wheel region relative to the primary drive region. With regard to the force flow, the primary actuator unit is arranged in series with the torsion portion, which functions as a passive spring. By contrast, the secondary actuator unit is provided for fast, short-term changes of the force acting on the wheel suspension element. Said secondary actuator unit can act both as a spring and as a damper, that is to say can prevent undesired vibration behavior. Since the torsion portion is at least partially bypassed, the coupling to the wheel region is more direct and, as it were, "harder". Accordingly, short-term adjustments by the secondary actuator unit have a much more direct effect on the wheel suspension element. On the other hand, the secondary actuator unit is of non-self-locking design, such that, when switched into a passive state, it can follow the movements of the torsion portion. In such a state, the dynamic behavior of the wheel suspension element is determined predominantly by the torsion portion and the primary actuator unit. Since the connection between the secondary actuator unit and the wheel region at least partially bypasses the torsion portion, it can be stated that the secondary actuator unit is, in terms of the force flow, arranged in parallel with respect to at least a part of the torsion portion. The torsion portion therefore also cannot act to any relevant degree as a low-pass filter between the secondary actuator unit and the wheel region or the wheel suspension element.

The primary actuator unit advantageously has a primary actuator and a self-locking primary gearing via which the primary actuator is coupled to the primary drive region. That is to say, the self-locking of the primary actuator unit is localized in the primary gearing. The primary gearing may be connected directly to the primary drive region. The secondary actuator unit also advantageously has a secondary actuator and a non-self-locking secondary gearing, via which the secondary actuator is coupled at least indirectly to the wheel region. The secondary gearing is thus designed such that it can be driven both by way of an input, which is connected to the secondary actuator, and by way of an output, which is coupled at least indirectly to the wheel region. Both the primary actuator and the secondary actuator are preferably designed as rotary actuators.

Although an implementation of the aforementioned configuration is possible for example using hydraulic or other actuators, it is particularly preferred for at least one actuator to be designed as an electric motor that is operable with a voltage of at least 48 V but preferably higher. The use of electric motors leads to design simplifications, because only electrical supply lines and possibly control lines are required for operating the actuators. A further advantage is for example that the secondary actuator can function as a generator and can recuperate energy that is introduced into the active spring unit by dynamic movements of the wheel suspension element. The use of an electric motor that is operated with a high voltage means that the power levels that are required during operation can be achieved with a lower current intensity. Accordingly, electrical supply lines can have a smaller cross section, without the risk of excessive power losses. This configuration is suitable in particular for electric vehicles because, in these, a high voltage is readily available from the vehicle battery or possibly from a fuel cell.

There are various possibilities with regard to the configuration of the primary gearing. For example, said primary gearing may be designed as a worm gearing, having a worm shaft coupled to the primary actuator and a worm gear connected rotationally conjointly to the primary drive region. Another possibility consists in the primary gearing being designed as a spindle drive, having a threaded spindle coupled to the primary actuator and having a spindle nut which interacts with a primary arm, said primary arm being connected rotationally conjointly to the primary drive region and extending at an angle with respect to the torsion axis. The primary arm may in particular extend at right angles to the torsion axis. Said primary arm may, as part of the spring element, be formed integrally with the torsion portion.

One embodiment provides for the secondary actuator to be motion-transmittingly coupled to a first gearwheel, said first gearwheel being offset transversely with respect to the torsion axis and being motion-transmittingly coupled to a second gearwheel which is coaxial with respect to the torsion axis. When the second actuator is operated, it drives the first gearwheel, which in turn drives the second gearwheel. Each of the gearwheels may be designed in particular as a toothed gear, for example as a spur gear. The two gearwheels may interact with one another directly or via at least one interposed element. In particular, the first gearwheel may interact with the second gearwheel via a closed, flexible transmission element. The transmission element may for example be a toothed belt, though a chain or a V-belt would for example also be conceivable. A circumference or a number of teeth of the first gearwheel may be smaller than the circumference or number of teeth of the second gearwheel, such that a reduction ratio is achieved.

In one embodiment, the secondary gearing has a reduction gearing which surrounds the torsion axis. The reduction gearing serves to convert a movement of the secondary actuator into a reduced movement, such that a fine manipulation of the wheel region can be achieved even with a relatively large movement of the secondary actuator. A torque of the secondary actuator can furthermore be boosted in this way. The reduction gearing surrounds the torsion axis and may for example be at least partially centered around same. Said reduction gearing may have at least one gear-wheel that is centered in relation to the torsion axis. The reduction gearing may for example be designed as a planetary gearing, but is preferably designed as a cycloid gearing. This embodiment may be combined with the aforementioned embodiment, with the second gearwheel being coupled to, or being part of, the reduction gearing. An above-described reduction ratio of the two gearwheels may be combined with the reduction ratio of the reduction gearing, and thus boosted.

As already mentioned, the secondary actuator unit may be coupled directly to the wheel region. Under certain circumstances, it may however be advantageous to provide an elastic connection to the wheel region. One possibility in this regard consists in the secondary actuator unit being coupled to the torsion portion in a secondary drive region arranged between the wheel region and the primary drive region, and thus being coupled to the wheel region via a part of the torsion portion. That is to say, the secondary actuator unit has a direct connection to the torsion portion, not in the wheel region but between the wheel region and the primary drive region. The corresponding secondary drive region is preferably arranged closer to the wheel region than to the primary drive region. In particular, the secondary gearing may be coupled in the secondary drive region to the torsion portion. The coupling to the wheel region is realized via that part of the torsion portion which is arranged between the wheel region and the secondary drive region. Said part may preferably constitute at most 50% or at most 30% of the torsion portion.

Another possibility consists in the secondary actuator unit being coupled to the wheel region via a secondary torsion element, bypassing the torsion portion. Like the torsion portion, the secondary torsion element is elastically deformable. Said torsion portion may consist of the materials that are also suitable for the torsion portion. In particular, said secondary torsion element can absorb energy by torsion about the torsion axis. Said secondary torsion element may be manufactured separately from the spring element and connected thereto in the wheel region. Said secondary torsion element may however also be manufactured integrally with the spring element. For example, the secondary torsion element may be arranged as an elongation of the torsion portion on a side of the wheel region that is situated opposite the torsion portion. Under certain circumstances, the secondary torsion element and torsion portion may transition directly into one another. Another possibility consists in the secondary torsion element surrounding the torsion portion, or a part thereof, radially at the outside in relation to the torsion axis. Here, the secondary torsion element forms a hollow profile within which the torsion portion or a part thereof is arranged. It can also be stated that the torsion portion and the secondary torsion element are arranged around one another. In any case, the torsion portion is bypassed, preferably completely bypassed, by the secondary torsion element.

In one embodiment, in the wheel region, the torsion portion is connected rotationally conjointly to a wheel lever that interacts motion-transmittingly with the wheel suspension element. The wheel lever may be formed integrally with the torsion portion, that is to say may be part of the spring element. A separately manufactured wheel lever, which is connected form-fittingly, frictionally and/or by integral bonding to the torsion portion, would however also be possible. Another possibility consists in that, in the wheel region, the torsion portion is connected rotationally conjointly to the wheel suspension element, wherein the torsion axis coincides with a pivot axis of the wheel suspension element. The wheel suspension element is in this case normally a wheel link, for example a transverse link or a longitudinal link. Owing to the rotationally conjoint connection to the wheel suspension element, pivoting of the latter about the pivot axis leads directly to a rotation of the wheel region, and thus generally to torsion of the torsion portion.

The orientation of the torsion axis within the vehicle, that is to say with respect to the vehicle longitudinal axis (X axis), vehicle transverse axis (Y axis) and vehicle vertical axis (Z axis), may be selected differently. The torsion axis is typically arranged within the horizontal plane (X-Y plane), though may also be inclined in the direction of the vertical axis (Z axis). Different orientations relative to the X-Y plane may be selected. For example, the torsion axis could extend with at least a component along the vehicle longitudinal axis. Said torsion axis may extend parallel to the vehicle longitudinal axis or enclose a small angle of for example at most 30° therewith. In another preferred embodiment, the torsion axis extends with at least a component along the vehicle transverse axis, but need not necessarily extend parallel thereto. Said torsion axis may also enclose an angle, for example of at most 30°, with the vehicle transverse direction.

Since an axle of the vehicle commonly has two wheels that are arranged to both sides of the vehicle body, one possibility consists in providing one active spring unit for each of the two wheels, wherein the two active spring units may be configured mirror-symmetrically. In another variant, one active spring unit may be used for the active sprung mounting of both wheels. Here, the spring element has two torsion portions which extend along the torsion axis from in each case one wheel region, in which the particular torsion portion is torque-transmittingly couplable to a wheel suspension element, to the primary drive region, wherein in each case one secondary actuator unit is torque-transmittingly coupled at least indirectly to the associated wheel region, at least partially bypassing the two torsion portions. The two torsion portions are preferably connected rotationally conjointly to one another, and are furthermore preferably formed integrally with one another. In any case, the two torsion elements are coupled in the primary drive region to the (single) primary actuator. Said primary actuator unit can thus bring about or manipulate simultaneous torsion of both torsion portions. By contrast, a dedicated secondary actuator unit is provided for each torsion portion. This means that, with regard to short-term applications of force, independent manipulation of the wheel suspension elements at the two sides is possible. By contrast, for quasi-steady-state, that is to say long-term manipulations, load is imparted identically to both sides by means of the primary actuator unit.

Further advantageous details and effects of the invention will be discussed in more detail below on the basis of an exemplary embodiment illustrated in the figures, in which:

FIG. 4 is a schematic plan view of a fourth embodiment of an active spring unit according to the invention;

In the various figures, identical parts are always denoted by the same reference designations, for which reason said parts will generally also be described only once.

Figure 1:
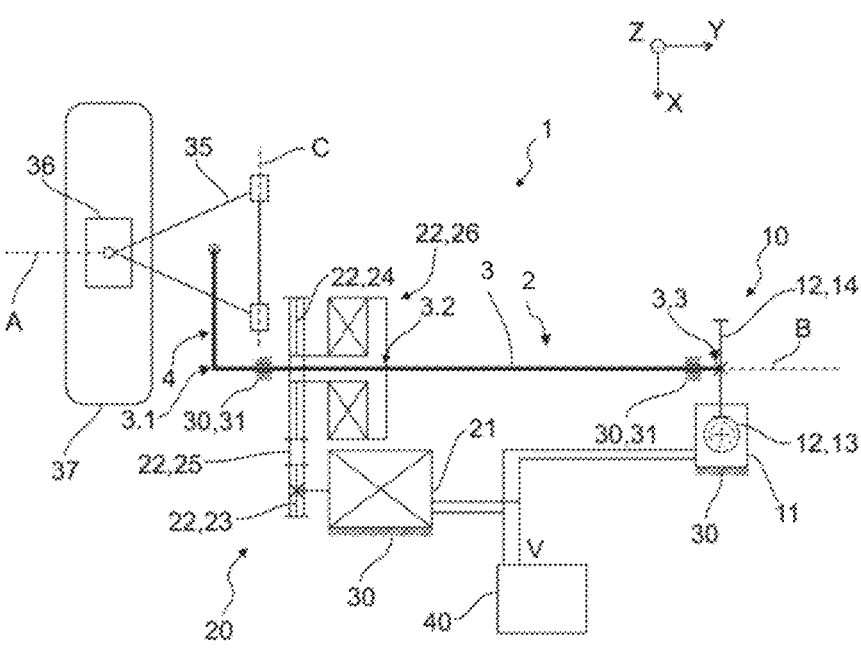
FIG. 1 is a schematic plan view of a first embodiment of an active spring unit according to the invention.

FIG. 1 shows a first embodiment of an active spring unit 1 according to the invention, which may be provided for example for an electric vehicle. A wheel suspension element 35, in this case a transverse link, is mounted on a vehicle body 30 so as to be pivotable about a pivot axis C which extends parallel to a vehicle longitudinal axis X. The wheel suspension element 35—optionally together with further elements that are not shown here—connects a wheel carrier 36 movably to the vehicle body 30, such that said wheel carrier can move with at least a component along a vehicle vertical axis Z that extends perpendicularly with respect to the plane of the drawing. A vehicle wheel 37 is mounted on the wheel carrier 36 so as to be rotatable about an axis of rotation A. A spring element 2, which may be formed for example from spring steel, has a torsion portion 3 which is mounted on the vehicle body 30 via pivot bearings 31. Said spring element extends along a torsion axis B, which extends parallel to a vehicle transverse axis Y. The torsion portion 3 has, at one end, a wheel region 3.1 from which a wheel lever 4, which is formed integrally with the torsion portion 3, extends to the wheel suspension element 35. A deflection of the wheel suspension element 35 and a rotation of the wheel region 3.1 about the torsion axis B are coupled to one another via the wheel lever 4.

At an opposite end, the torsion portion 3 has a primary drive region 3.3, in which said torsion portion is connected to a primary actuator unit 10. Said primary actuator unit has a primary actuator 11 in the form of an electric motor, which drives a worm shaft 13 of a primary gearing 12. The worm shaft 13 interacts with a worm gear 14 that is connected rotationally conjointly to the primary drive region 3.3. Since the primary gearing 12 is of self-locking design, the operation of the primary actuator 11 can cause a rotation of the primary drive region 3.3 about the torsion axis B, whereas, conversely, a torque acting in the torsion portion 3 cannot cause an adjustment of the primary gearing 12 or of the primary actuator 11. The primary actuator 11 is provided for generating a preloading torsional moment in the torsion portion 3, which changes only relatively seldom and/or is changed only slowly. Accordingly, the exertion of load on the primary suspension element 35 by the primary actuator 11 can be referred to as slowly changing, or as being quasi-steady-state.

Between the wheel region 3.1 and the primary drive region 3.3, the torsion portion 3 has a secondary drive region 3.2, in which said torsion portion is coupled to a secondary actuator unit 20. The secondary actuator unit 20 has a secondary actuator 21, which is likewise in the form of an electric motor. Like the primary actuator 11, said secondary actuator is fed by a voltage source 40, for example a battery unit of the electric vehicle, which delivers a voltage V which may in particular be a high voltage of at least 48 V. Accordingly, only relatively moderate currents are required for the operation of the actuators 11, 21, which in turn results in only limited resistance losses even in the case of relatively small conductor cross sections.

The secondary actuator 21 drives a first gearwheel 23, in the form of a spur gear, of a secondary gearing 22. The first gearwheel 23 is drivingly coupled, via a toothed belt 25, to a second gearwheel 24 which is likewise in the form of a spur gear and which is coaxial with respect to the torsion portion 3. The second gearwheel 24 is larger, and has a greater number of teeth than, the first gearwheel 23, whereby the movement of the secondary actuator 21 is passed through a reduction ratio. The reduction ratio is further boosted by a reduction gearing 26 which surrounds the torsion axis B and which may for example be designed as a cycloid gearing. The reduction gearing 26 is driven by the second gearwheel 24 and, in the secondary drive region 3.2, is connected rotationally conjointly to the torsion portion 3. Operation of the secondary actuator 21 can, via the secondary gearing 22, cause a rotation of the secondary drive region 3.2, whereby a torque is transmitted via a part of the torsion portion 3 to the wheel region 3.1, which in turn leads to a change in a force acting on the wheel suspension element 35. The secondary actuator 21 is provided for causing short-term changes in the force acting on the wheel suspension element 35. This can also be referred to as dynamic manipulation. This is made possible inter alia by the fact that the spacing of the secondary drive region 3.2 to the wheel region 3.1 amounts to only approximately 30% of the length of the torsion portion 3. That is to say, the torsion portion 3 is predominantly bypassed, and therefore cannot act to any significant degree as a low-pass filter. On the other hand, since the secondary gearing is of non-self-locking design, the secondary actuator 21 can also be operated as a generator, wherein movements of the wheel suspension element 35 drive the secondary actuator 21 via the wheel lever 4, a part of the torsion portion 3 and the secondary gearing 22. In this way, the secondary actuator 21 can recuperate energy, which in turn can be stored in the voltage source 40.

Figure 2:
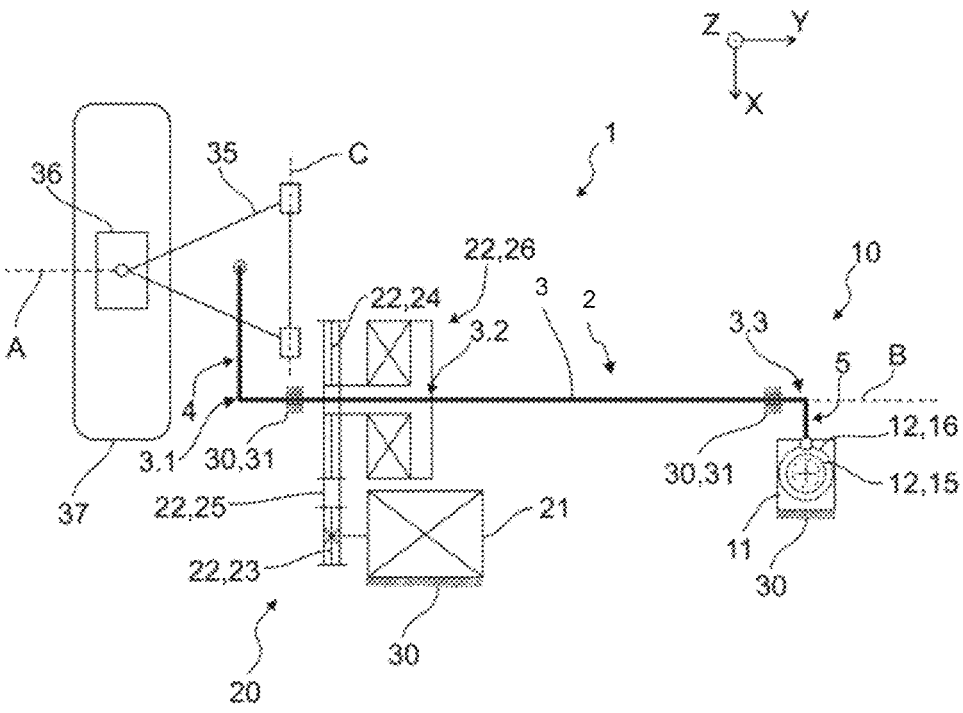
FIG. 2 is a schematic plan view of a second embodiment of an active spring unit according to the invention.

FIG. 2 shows a second embodiment of an active spring unit 1 according to the invention, which substantially corresponds to the first embodiment and in this respect will not be discussed once again. For the sake of clarity, the voltage source 40 has been omitted here and in the further figures. In this embodiment, a primary arm 5 is connected integrally to the primary drive region 3.3 of the torsion portion 3. Said primary arm is connected, in a manner not illustrated in any more detail here, to a spindle nut 16 of the primary gearing 12, which in this case is in the form of a spindle drive. The spindle nut 16 is seated on a threaded spindle 15, which is driven by the primary actuator 11. This design of the primary gearing 12 is also self-locking.

Figure 3:
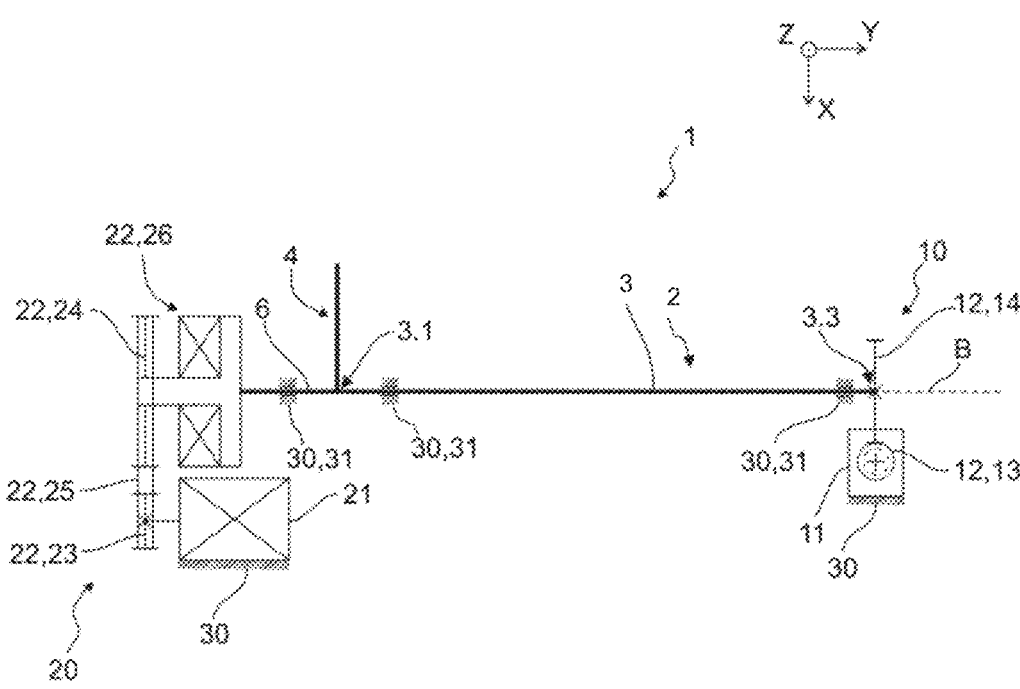
FIG. 3 is a schematic plan view of a third embodiment of an active spring unit according to the invention.

FIG. 3 shows an embodiment in which the spring element 2 is extended, in the form of a secondary torsion element 6, beyond the wheel region 3.1. The secondary gearing 22, which is designed as in the first and second embodiments, interacts with the secondary torsion element 6. In this case, too, the secondary drive unit 20 is coupled with limited elasticity to the drive region 3.1, wherein, in this case, the torsion portion 3 is completely bypassed in terms of the force flow. Here, and in FIG. 4, the wheel suspension element 35, the wheel carrier 36 and the vehicle wheel 37 have been omitted.

Figure 4:
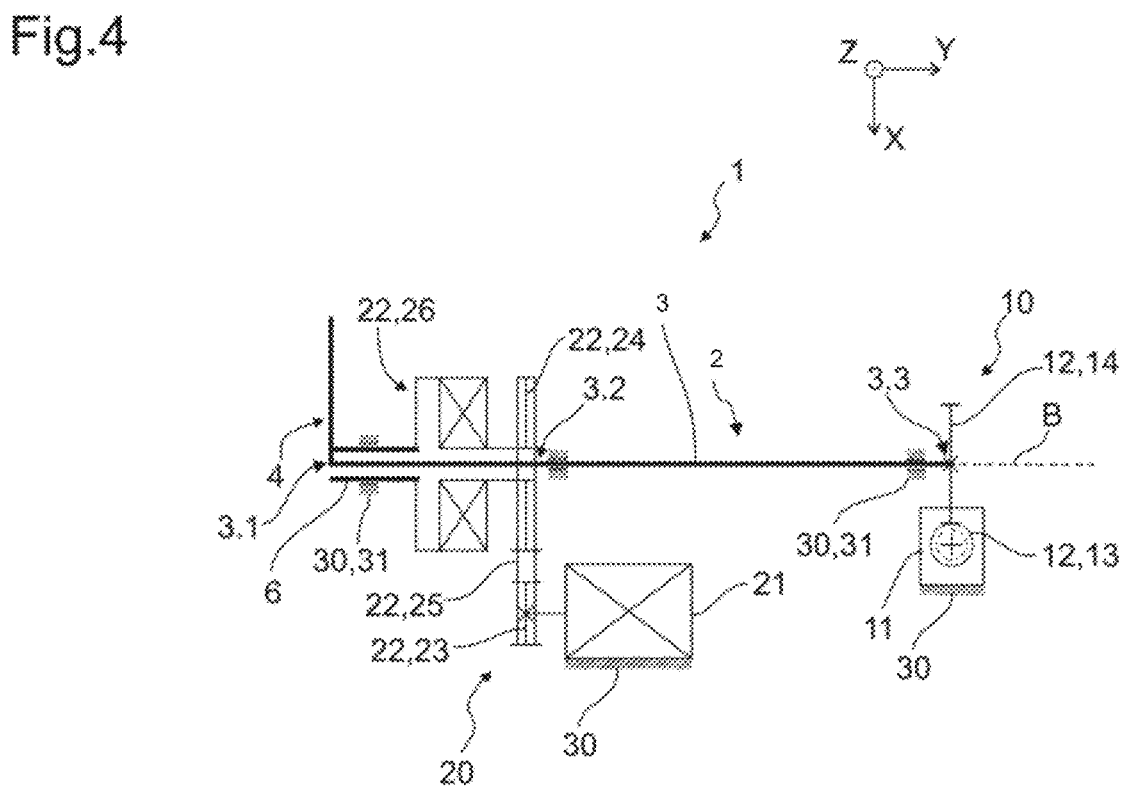

FIG. 4 shows a fourth embodiment having a secondary torsion element 6 which, in the form of a hollow profile, surrounds a part of the torsion portion 3. In this embodiment, too, the secondary actuator unit 20 is coupled to the wheel region 3.1, completely bypassing the torsion portion 3.

Figure 5:
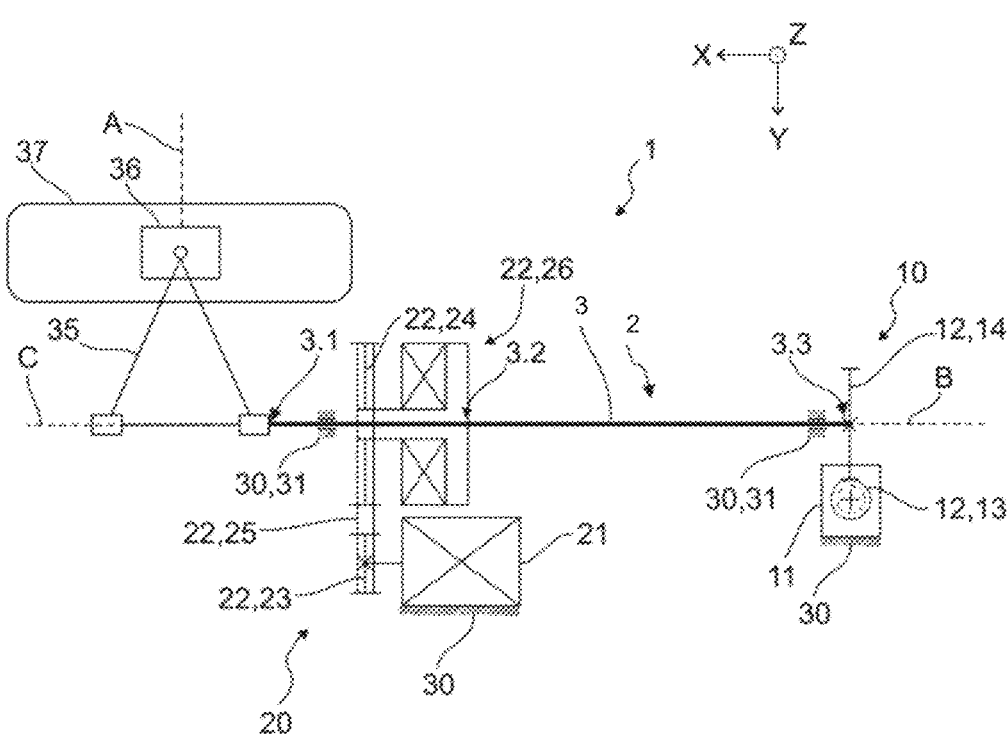
FIG. 5 is a schematic plan view of a fifth embodiment of an active spring unit according to the invention.

FIG. 5 shows a fifth embodiment, which substantially corresponds to the first embodiment. However, in this case, the torsion portion 3 is oriented parallel to the vehicle longitudinal axis X. The spring element 2 also does not have a wheel lever 4, but is rotationally conjointly connected directly to the wheel suspension element 35. The torsion axis B and the pivot axis C of the wheel suspension element 35 coincide. A pivoting movement about the pivot axis C is thus directly coupled to a rotation of the wheel region 3.1 about the torsion axis B.

Figure 6:
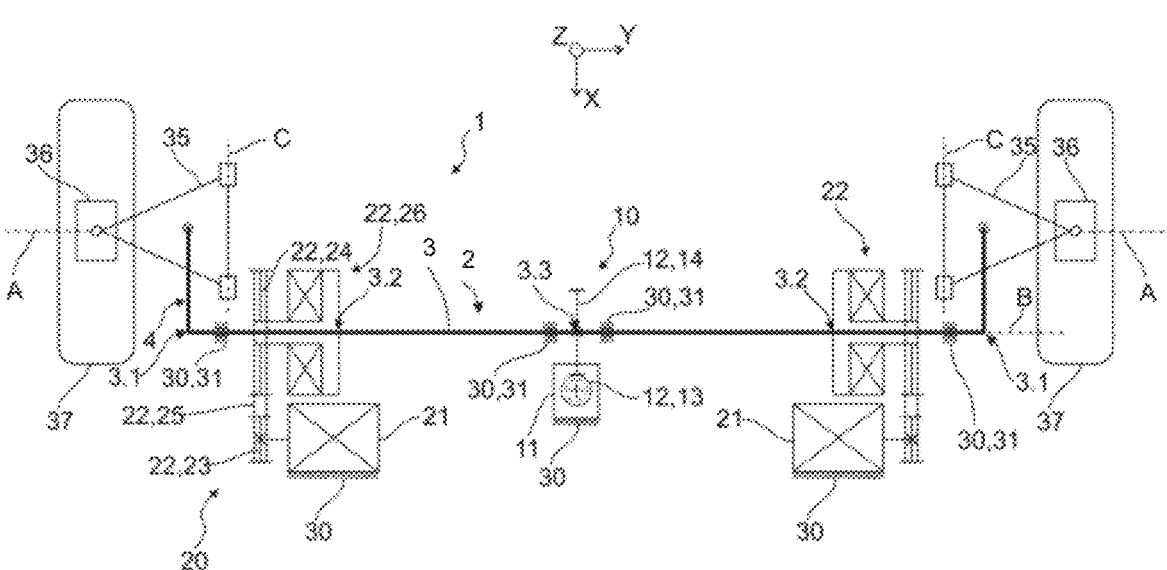
FIG. 6 is a schematic plan view of a sixth embodiment of an active spring unit according to the invention.

FIG. 6 shows a sixth embodiment, in which the active spring unit 1 is designed for the active sprung mounting of two vehicle wheels 37. Here, with respect to the vehicle transverse axis Y, the spring element 2 extends to both sides of the primary drive region 3.3, in two torsion portions 3, to two edge regions 3.1 which are arranged to both sides of the vehicle body 30. Two secondary actuator units 20, which are in principle structurally identical but are mirror-symmetrical with respect to one another, interact with the torsion portions 3 via two secondary drive regions 3.2, which are likewise arranged symmetrically on the spring element 2.

LIST OF REFERENCE DESIGNATIONS

1 Active spring unit
2 Spring element
3 Torsion portion
3.1 Wheel region
3.2 Secondary drive region
3.3 Primary drive region
4 Wheel lever
5 Primary lever
6 Secondary torsion element
10 Primary actuator unit
11 Primary actuator
12 Primary gearing
13 Worm shaft
14 Worm gear
15 Threaded spindle
16 Spindle nut
20 Secondary actuator unit
21 Secondary actuator
22 Secondary gearing
23, 24 Gearwheel
25 Toothed belt
26 Reduction gearing
30 Vehicle body
31 Pivot bearing
35 Wheel suspension element
36 Wheel carrier
37 Vehicle wheel
40 Voltage source
A Axis of rotation
B Torsion axis
C Pivot axis
V Voltage
X X axis
Y Y axis
Z Z axis

What is claimed is:

1. An active spring unit for the sprung mounting of a wheel suspension element relative to a vehicle body, the active spring unit comprising a spring element which is mounted on the vehicle body and which has a torsion portion which extends along a torsion axis from a wheel region, in which said torsion portion is couplable torque-transmittingly to the wheel suspension element, to a primary drive region, in which said torsion portion is coupled torque-transmittingly to a self-locking primary actuator unit, wherein a non-self-locking secondary actuator unit is torque-transmittingly coupled at least indirectly to the wheel region, at least partially bypassing the torsion portion.

2. The active spring unit according to claim 1,
wherein the locking primary actuator unit has a primary actuator and a self-locking primary gearing via which the primary actuator is coupled to the primary drive region, and the non-self-locking secondary actuator unit has a secondary actuator and a non-self-locking secondary gearing via which the secondary actuator is coupled at least indirectly to the wheel region.

3. The active spring unit according to claim 2,
wherein at least one of the primary actuator and secondary actuator is in the form of an electric motor operable with a voltage of at least 48 V.

4. The active spring unit according to claim 2,
wherein the secondary actuator is motion-transmittingly coupled to a first gearwheel, said first gearwheel being offset transversely with respect to the torsion axis and being motion-transmittingly coupled to a second gearwheel which is coaxial with respect to the torsion axis.

5. The active spring unit according to claim 2,
wherein the non-self-locking secondary gearing has a reduction gearing which surrounds the torsion axis, and wherein the reduction gearing is a cycloid gearing.

6. The active spring unit according to claim 1,
wherein the non-self-locking secondary actuator unit is coupled to the torsion portion in a secondary drive region arranged between the wheel region and the primary drive region, and is thus coupled to the wheel region via a part of the torsion portion.

7. The active spring unit according to claim 1,
wherein the secondary actuator unit is coupled to the wheel region via a secondary torsion element, bypassing the torsion portion.

8. The active spring unit according to claim 1,
wherein, in the wheel region, the torsion portion is connected rotationally conjointly to a wheel lever that interacts motion-transmittingly with the wheel suspension element, or said torsion portion is connected rotationally conjointly to the wheel suspension element, wherein the torsion axis coincides with a pivot axis of the wheel suspension element.

9. The active spring unit according to claim 1,
wherein the spring element has two torsion portions which extend along the torsion axis from one wheel region, in which the particular torsion portion is torque-transmittingly couplable to a wheel suspension element, to the primary drive region, wherein in each case one non-self-locking secondary actuator unit is torque-transmittingly coupled at least indirectly to the associated wheel region, at least partially bypassing the two torsion portions.

* * * * *